May 28, 1940.   R. M. PARTINGTON   2,202,716
ELECTRIC CIRCUIT
Filed Sept. 12, 1939
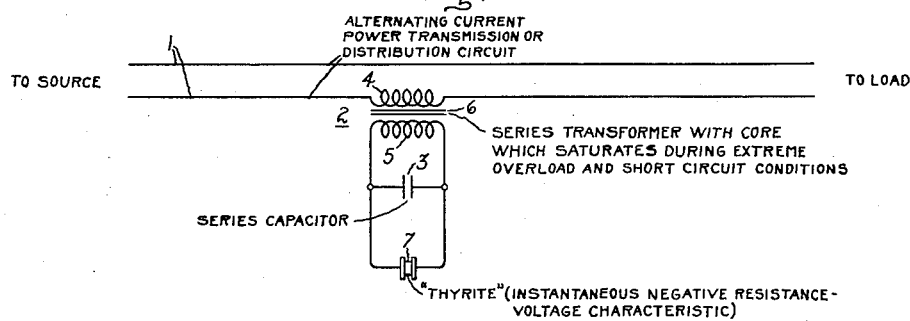
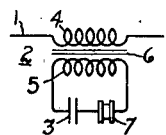
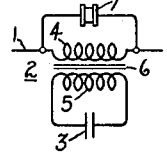
Inventor:
Robert M. Partington,
by Harry E. Dunham
His Attorney.

UNITED STATES PATENT OFFICE 2,202,716

ELECTRIC CIRCUIT

Robert M. Partington, New Lebanon, N. Y., assignor to General Electric Company, a corporation of New York Application September 12, 1939, Serial No. 294,462

10 Claims. (Cl. 172—246)

This invention relates to electric circuits and more particularly to improvements in alternating current power distribution and transmission circuits containing a series capacitor connected therein by means of a series transformer.

The commercial distribution of electricity is today accomplished almost entirely by the so-called constant potential alternating current system. In this system changes in load cause corresponding changes in current and the potential of the system remains substantially constant. Practically all of the transmission and distribution circuits have an appreciable amount of distributed natural inductance which causes an objectionable voltage drop which is proportional to the magnitude of the current and which subtracts more and more directly from the system voltage as the power factor decreases in a lagging direction. A well-known way of neutralizing the inductance and thus eliminating this voltage drop is to connect a capacitor or electrical condenser in series in the circuit. The current rating of most distribution circuits is higher than capacitors can be economically manufactured to carry. Therefore, it has been proposed to connect the series capacitor in the distribution circuit by means of a series transformer which steps down the current rating and steps up the voltage rating so that the required amount of capacitive volt amperes may be obtained from a relatively low-cost low-current high-voltage capacitor.

It has been found in practice, however, that such an arrangement often produces a curious and puzzling effect when the circuit is subjected to heavy overload or short-circuit currents. This effect is characterized by an inversion of the reactance characteristics of the combination of series transformer and capacitor so that it acts like an inductance instead of a capacitance and thus accentuates rather than neutralizes the inductive voltage drop in the circuit. This in itself is not objectionable and in fact would be desirable if it only lasted during overcurrent conditions because the added inductive reactance effect would tend to limit the flow of overload or short-circuit current. However, this condition persists until the circuit current falls to a very low value which is usually far below the normal current in the circuit and in fact is at the lower part of the normal current range.

This phenomenon is essentially the jumping phenomenon of ferro-resonance and may be explained as follows: As the circuit current increases due to an overload or a short-circuit the core of the series transformer is operated at higher and higher flux densities. This eventually causes saturation of the core and causes the transformer to draw a higher and higher magnetizing current. By neglecting the losses in the series transformer and in the series capacitor the transformer primary current is equal to the difference between the transformer magnetizing current and the capacitor current because these two currents are in phase opposition with respect to each other. As long as the capacitor current, when referred to the primary side of the transformer, exceeds the transformer magnetizing current the net current can only increase when the capacitor current increases faster than the transformer magnetizing current but due to saturation of the core of the transformer a point is soon reached when the transformer magnetizing current increases faster than the capacitor current. The point where the change-over occurs is the point on the saturation curve of the core of the series transformer at which its slope is equal to the slope of the voltampere characteristic of the capacitor. Beyond this point, as measured from the origin of the two characteristics, the transformer magnetizing current increases faster than the capacitor current, thereby producing a decrease in the net current which obviously is an impossible condition in the main circuit in which an overload or a short-circuit is actually causing the current to increase rapidly. Consequently, the voltampere characteristic of the combination of series transformer and capacitor jumps to a value on the other side of the resonance point. This value is one at which the net current is equal to the current at the point where the slope of the saturation curve is equal to the slope of the capacitor characteristic. However, as the resonance point has been passed the voltampere characteristic of the saturation curve of the iron core and the characteristic of the capacitor have crossed each other and the transformer magnetizing current now exceeds the capacitor current, thereby producing an inductive reactance effect. From this point on, the net current will increase to a large value limited only by the natural constants of the system and the system voltage. If now the main circuit current decreases it can fall to almost zero with the transformer magnetizing current still exceeding the capacitor current because when these two currents become equal the net current is zero and this point corresponds most closely to a resonance condition. Actually the current does not quite fall to zero because of the current necessary to supply the losses in the transformer and capacitor. As the total primary current in the transformer can not fall below this loss current even when the transformer magnetizing current and the capacitor current exactly neutralize each other, further decreases in current can only be produced by the voltampere characteristic of the combination of capacitor and reactor jumping to a point near the origin of the magnetizing and capacitor characteristics at which the voltage across the combination will be very much reduced, thus permitting a reduction in loss current and changing over the characteristics of the combination from inductive to capacitive.

It has been proposed to increase the circuit current value at which the objectionable inverted ferro-resonant operation ceases, by means of a resistor connected in series with the capacitor or in parallel with the primary winding of the series transformer. This resistor increases the losses of the transformer-capacitor combination so that at the main circuit current value at which the transformer magnetizing current and the capacitor current are equal the circuit current will still be relatively high by reason of the loss current and as soon as the main circuit current decreases further the ferro-resonant condition will terminate and the combination will function as a net capacitive reactance. However, the continuous losses in such a circuit are relatively high even during normal operation so that such an arrangement alone is not desirable.

In accordance with a preferred embodiment of this invention a resistance having a negative resistance-voltage characteristic is connected across the secondary winding of the series transformer in parallel with the capacitor. This resistor has a relatively high resistance value during normal current values in the circuit. However, when overloads or short-circuits occur the approach to resonance caused by saturation of the transformer core and its accompanying increase in voltage across the capacitor-transformer combination causes a marked decrease in the value of the resistance, thus increasing its losses as these losses are proportional to the square of the current while being only proportional to the first power of the resistance. Thus, the losses can be made relatively high when high losses are needed but are relatively low during normal conditions.

This arrangement has the advantage over a negative impedance current characteristic inductance that the resistance is independent of frequency whereas with an inductance, such as a saturable core reactor, the reactance varies directly with changes in frequency and as the saturation of the transformer core produces marked harmonics or higher frequency currents a saturating reactor would actually not decrease its reactance and thus would not increase the losses during the existence of circuit conditions when the high losses would be desirable.

While a negative resistance-voltage characteristic resistance element is preferably connected in shunt circuit relationship with the series capacitor across the secondary winding of the series transformer, I have found that the use of an ordinary linear resistor connected in this manner will also cure the ferro-resonant difficulty although of course the continuous losses are higher.

I have also found that the connection of the negative resistance current characteristic resistance element in series with the capacitor or in shunt circuit relationship with the primary winding of the series transformer will cure the above described ferro-resonant trouble.

An object of the invention is to provide a new and improved electric circuit.

Another object of the invention is to provide by means of a negative resistance-voltage characteristic resistance element an improved series-capacitor transformer combination for an alternating current distribution circuit.

The invention will be better understood from the following description taken in connection with the accompanying drawing and its scope will be pointed out in the appended claims.

In the drawing, Fig. 1 is a diagrammatic illustration of a preferred embodiment of the invention; Fig. 2 is a modification in which the resistance element is connected in series with the capacitor; and Fig. 3 is another modification in which the resistance element is connected in parallel with the primary winding of the series capacitor.

Referring now to the drawing and more particularly to Fig. 1, there is shown therein an alternating current power transmission or distribution circuit 1 through which power is arbitrarily assumed to flow from left to right as viewed in the drawing. This circuit is typically a conventional power circuit forming part of an ordinary constant potential alternating current distribution system and as such it has an appreciable amount of distributed natural inductance. Serially connected in the circuit 1 by means of a series transformer 2 is a capacitor 3 for neutralizing the line inductance. The transformer has a primary winding 4 connected in the power circuit and a secondary winding 5 across which the capacitor is connected. The transformer also has an iron core 6 which becomes magnetically saturated during extreme overload and short-circuit conditions on the main circuit 1. Normally, that is to say, when the main circuit current is below its rated full load or safe continuous value, the core is unsaturated and the magnetizing current of the transformer is relatively small compared with the capacitor current as referred to the primary side of the transformer. However, as has been explained above, when the transformer core saturates, the magnetizing current increases faster than the capacitor current and when it is equal to the capacitor current a resonant condition exists producing a relatively high voltage across the transformer and capacitor. Further increases in line current cause the magnetizing current to exceed the capacitor current and due to the peculiar ferro-resonant characteristics of the saturable series transformer and capacitor the voltage across the transformer-capacitor combination will remain relatively high until the line current is reduced to a very low value which is much lower than the normal rated current of the circuit.

In order to prevent this ferro-resonant phenomenon from adversely effecting the function of the series capacitor when the circuit current is reduced to values within its normal range after an overload or short-circuit has occurred I connect a negative resistance-voltage characteristic resistance element 7 across the capacitor and the secondary winding of the transformer. By "negative resistance-voltage characteristic" it is meant that the resistance of the element decreases when the voltage across it or the current through it increases. This element is preferably composed of the ceramic resistance material consisting of graphite and silicon carbide in the proportions and heat treated in the manner described and claimed in McEachron Patent No.

1,822,742, granted September 8, 1931, and assigned to the assignee of the present application. This material as manufactured by applicant's assignee, bears the trade name "Thyrite." Its characteristic is defined by the equation $RI^a=C$ where R is its instantaneous resistance, I is the current through it, $a$ is an exponent (typically 0.7) which is determined by the proportions of its ingredients and the controls used in its manufacture and C is a constant determined by the physical dimensions of the particular resistance element. Its resistance is substantially independent of frequency and temperature and its change in resistance occurs substantially instantaneously when its current and voltage change.

The particular resistance element which is used with my invention is so proportioned and constructed that at the voltage thereacross corresponding to the condition in which the magnetizing current of the transformer is equal to the capacitor current the current through it when referred to the primary side of the transformer will be slightly greater than the full load current of the circuit. If therefore the current in the main circuit 1 is decreased to the full load current the reactive current taken by the transformer and capacitor will have to be increased, thereby reducing the voltage across the transformer-capacitor combination and decreasing the resistor current. The decrease in voltage is accompanied by a greater decrease in magnetizing current than the decrease in capacitor current so that the capacitive reactance function of the capacitor is restored and the combination works in the proper manner during normal operation of the circuit, that is to say, whenever the circuit current is within its normal range.

As the resistance of the element 7 increases very rapidly with decreases in voltage across it the current through this element also decreases very rapidly so that the I²R losses in the resistor become very small during normal operation.

In Fig. 2 the resistance element 7 is connected in series with the capacitor 3. It functions in substantially the same manner as in Fig. 1 to increase the resistance loss current of the series transformer-capacitor combination during overload conditions.

In the additional modification shown in Fig. 3, the resistance element 7 is connected in parallel with the primary winding 4. While its proportions will be different from those of Fig. 1, just as its proportions in Fig. 2 are different from those of Fig. 1, nevertheless it will operate in substantially the same manner in that the marked increase in voltage across the series transformer due to the ferro-resonant phenomenon will cause it to pass a substantial part of the current of the circuit so that when the current drops to the full load current or lower, the ferro-resonant phenomenon will have to terminate abruptly, thereby greatly reducing the voltage across the resistor 7 whereby its resistance increases so that it draws a negligible current and the entire combination of capacitor 3, transformer 4, and resistor 7 acts substantially as a capacitive reactance.

The negative resistance-voltage characteristic resistance element when connected as in Figs. 1 and 3, also acts to limit the voltage across the capacitor during overloads and short circuits and thus serves to protect the capacitor from dielectric failure as a result of overvoltage.

Where there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In a substantially constant voltage variable load alternating current power distribution circuit of the type having an inductance neutralizing series capacitor connected therein by means of an iron cored series transformer and in which short-circuit and other abnormally high currents magnetically saturate said core and produce a jumping ferro-resonant condition between said capacitor and transformer which causes those two elements to produce a resultant inductive effect in said circuit which persists until the circuit current falls to a relatively low value within its normal current range, the combination with said capacitor and transformer of a resistance element having a negative resistance-voltage characteristic which is substantially independent of temperature and frequency and substantially instantaneous in action connected to said series transformer so as to have a voltage applied thereacross which is proportional to the voltage of said series transformer, said resistance element having such a resistance at the relatively high voltage across said transformer accompanying the closest approach to resonance between said capacitor and transformer that it will cause the current in said circuit under such conditions to exceed the continuous full load current rating of said circuit.

2. An arrangement as described in claim 1 in which the characteristic of the resistance element is defined by the equation $RI^a=C$ where R is its resistance, I is the current through it, $a$ is an exponent determined by its composition and method of manufacture and C is a constant determined by its physical dimensions.

3. In an alternating current power distribution system of the substantially constant potential type, in combination, a variably loaded circuit which is subject to occasional overloads and short circuits and which has an appreciable amount of inductance, a capacitor for normally neutralizing said inductance, a series transformer having a primary winding connected in said circuit and having a secondary winding connected across said capacitor, the current range in said circuit being so great that extreme overloads and short-circuit currents cause magnetic saturation of said transformer thereby producing a ferro-resonant phenomenon which causes a resultant inductive voltage drop across said primary winding which persists until the circuit current is reduced to a relatively low value in its normal range, and means for raising the circuit current at which said phenomenon ceases to a value exceeding the full load current rating of said circuit and capacitor comprising a resistance element connected in parallel with said capacitor across the secondary winding of said transformer, said resistance element having such a resistance value that when the magnetizing current of said transformer substantially equals the capacitor current when referred to the primary side of said transformer the resistance element current when referred to the primary side of said transformer will exceed the full load current rating of said circuit.

4. The combination as in claim 3 in which the resistance element has a negative resistance-voltage characteristic which is substantially independent of temperature and frequency and which is substantially instantaneous in action.

5. The combination as in claim 3 in which the resistance element has a characteristic which is defined by the equation $RI^a=C$ where R is its resistance, I is the current through it, $a$ is an exponent determined by its composition and method of manufacture and C is a constant determined by its physical dimensions.

6. In an alternating current power distribution system of the substantially constant potential type, in combination, a variable load circuit which is occasionally subjected to heavy current surges caused by overloads and short circuits, said circuit having a substantial amount of natural distributed inductance, a series capacitor effectively connected in said circuit for neutralizing said inductance, and means for limiting the voltage across said capacitor to a safe value during said current surges comprising a negative resistance-voltage characteristic ceramic resistance element effectively connected in shunt circuit relationship with said capacitor, the resistance characteristic of said element being substantially instantaneous in action and being substantially independent of temperature and being defined by the equation $RI^a=C$ where R is its resistance, I is the current through it, $a$ is an exponent determined by its composition and method of manufacture and C is a constant determined by its physical dimensions.

7. The arrangement as described in claim 1 in which the negative resistance-voltage characteristic resistance element is connected in series circuit relationship with the capacitor.

8. The arrangement as described in claim 1 in which the resistance element is connected in series circuit relationship with the capacitor and in which the negative characteristic of the resistance element is defined by the equation $RI^a=C$ where R is its resistance, I is the current through it, $a$ is an exponent determined by its composition and method of manufacture and C is a constant determined by its physical dimensions.

9. The arrangement as described in claim 1 in which the negative characteristic resistance element is connected in shunt circuit relationship with the primary winding of the series transformer.

10. The arrangement described in claim 1 in which the resistance element is connected in shunt circuit relationship with the primary winding of the series transformer and in which the negative characteristic of the resistance element is defined by the equation $RI^a=C$ where R is its resistance, I is the current through it, $a$ is an exponent determined by its composition and method of manufacture and C is a constant determined by its physical dimensions.

ROBERT M. PARTINGTON.